United States Patent [19]

Ando et al.

[11] Patent Number: 5,708,891
[45] Date of Patent: Jan. 13, 1998

[54] CAMERA HAVING A BARRIER MOVABLE TO COVER AND EXPOSE AN IMAGING LENS

[75] Inventors: Hiroyuki Ando, Hachioji; Tatsuya Suzuki, Tokyo; Takashi Inoue, Hachioji; Takashi Muroi, Tachikawa, all of Japan

[73] Assignee: Olympus Optical Co., Ltd., Tokyo, Japan

[21] Appl. No.: 702,016

[22] Filed: Aug. 23, 1996

[30] Foreign Application Priority Data

Sep. 1, 1995 [JP] Japan ................... 7-225582

[51] Int. Cl.⁶ .................................................. G03B 17/04
[52] U.S. Cl. ........................................ 396/448; 396/349
[58] Field of Search ........................... 396/348, 349, 396/448

[56] References Cited

U.S. PATENT DOCUMENTS

| | | | |
|---|---|---|---|
| 4,171,894 | 10/1979 | Yamada | 396/349 |
| 4,219,265 | 8/1980 | Waaske | 396/349 |
| 4,522,478 | 6/1985 | Kando et al. | 396/448 |
| 4,557,574 | 12/1985 | Kohno et al. | 395/448 |
| 4,589,747 | 5/1986 | Nakayama et al. | 396/448 |
| 4,597,657 | 7/1986 | Wakabayashi | 396/348 |
| 5,508,769 | 4/1996 | Inoue et al. | 396/349 |

FOREIGN PATENT DOCUMENTS

| | | |
|---|---|---|
| 61-284739A | 12/1986 | Japan . |
| 6-102570 | 4/1994 | Japan . |

*Primary Examiner*—A. A. Mathews
*Attorney, Agent, or Firm*—Louis Weinstein

[57] ABSTRACT

A camera has barrier supported by a rail block attached to the body of the camera and movable from a fully closed position where the barrier entirely covers the front of an imaging lens to a fully opened position where the barrier is fully retracted clear of the front of the imaging lens. At its fully closed position and fully opened position, the barrier clicks when a ball is pressed into contact with a cam formed on the rear surface of the barrier. Projection of the ball is restrained by a slip-off prevention portion of the rail block so that the barrier is not subjected to an excessive urging force. In the camera, the barrier is not subjected to an unnecessarily large urging force and is less likely to lift away from the camera. The advantage is particularly great if the barrier in use is narrower than the outer diameter of a lens barrel.

13 Claims, 5 Drawing Sheets

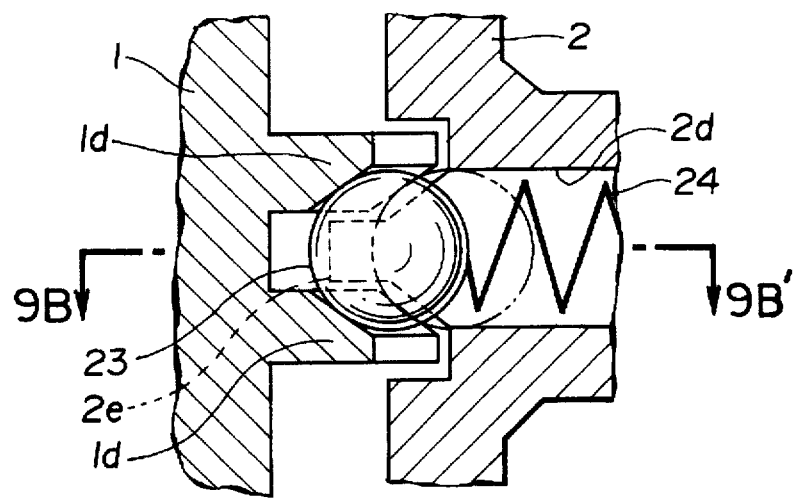
FIG. 9A
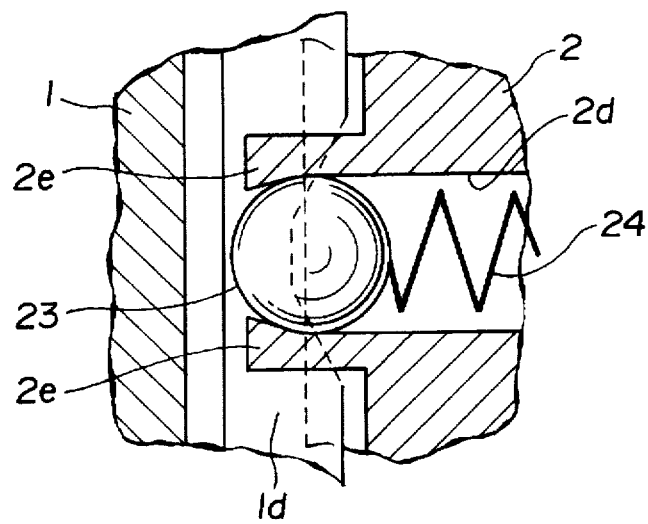
FIG. 9B
FIG. 10
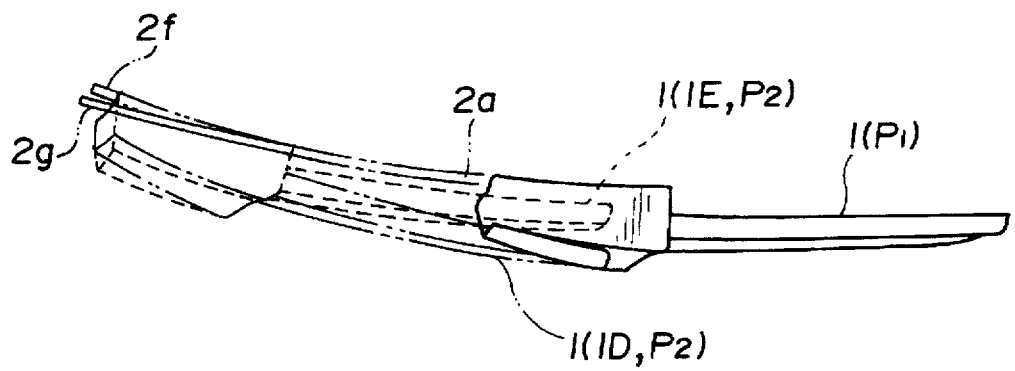

5,708,891

1

CAMERA HAVING A BARRIER MOVABLE TO COVER AND EXPOSE AN IMAGING LENS

BACKGROUND OF THE INVENTION

1. Field of the Invention

The present invention relates to a camera having a barrier movable to cover and expose an imaging lens.

2. Related Art Statement

Japanese Unexamined Patent Publication No. 6-102570 discloses a collapsible-type camera having a barrier mechanism for protecting a camera imaging lens. In this disclosure, a slidably movable barrier as a lens protective cover is arranged in front of the imaging lens, and this barrier is provided with a built-in ball that is urged in a direction in parallel with the optical axis of the camera to present the feel of click or tactility.

In this arrangement, however, the urging of the ball may act on the barrier without any restraint, thereby lifting the barrier. To prevent such movement, the camera body side needs a barrier restraint member.

In contrast to the above camera, the camera with a lens cover, disclosed in Japanese Patent Publication No. 61-284739, employs a shaft terminating in a semi-spherical form at one end, as a click member, instead of the ball. This shaft has a fin (projection). The fin serves the function of lifting the barrier so that a front cover is protected from damage.

Although the above camera with the lens cover prevents the barrier from lifting, the use of the shaft with the fin, terminating in the semi-spherical form rather than the ball, increases the manufacturing cost of the shaft. The shaft with the fin may serve a slip-off prevention function. However, in this structure of the known art, any particular slip-off prevention function is not particularly needed.

OBJECT AND SUMMARY OF THE INVENTION

Accordingly it is an object of the present invention to provide a camera with barrier means that suffers less from lifting.

The camera of the present invention, having barrier means movable from a fully closed position where the barrier means entirely covers the front of an imaging lens to a fully opened position where the barrier means is fully retracted clear of the front of the imaging lens, comprises ball means mounted on a camera body and urged in such a direction as to press the barrier means, a cam mounted on the barrier means, for causing the barrier means to click in cooperation with the ball means at least at either the fully closed position or the fully opened position and a projection restraint member for restraining projection of the urged ball means out of the camera body.

In the above camera, the barrier means clicks with the urged ball means pressed into contact with the cam on the rear surface of the barrier means. Projection of the ball means is restrained by the projection restraint means so that an unnecessarily large force is not exerted upon the barrier means. Thus, the barrier means suffers less from lifting. In case of compact barrier means, the projection restraint member is small enough to be accommodated in a limited small space, and thus the advantage of the present invention is great.

These and other objects and advantages of the present invention will become further apparent from the following detailed description.

2

BRIEF DESCRIPTION OF THE DRAWINGS

FIG. 9A is an enlarged vertical cross-sectional view showing the click mechanism constituting barrier click means of the camera of a second embodiment of the present invention.

FIG. 9B is a cross-sectional view taken along a line 9B—9B in FIG. 9A.

FIG. 10 illustrates the movement of the barrier from its fully closed position to its fully opened position in a third embodiment of the present invention when the camera is viewed from above.

DETAILED DESCRIPTION OF THE PREFERRED EMBODIMENTS

Figure 1:
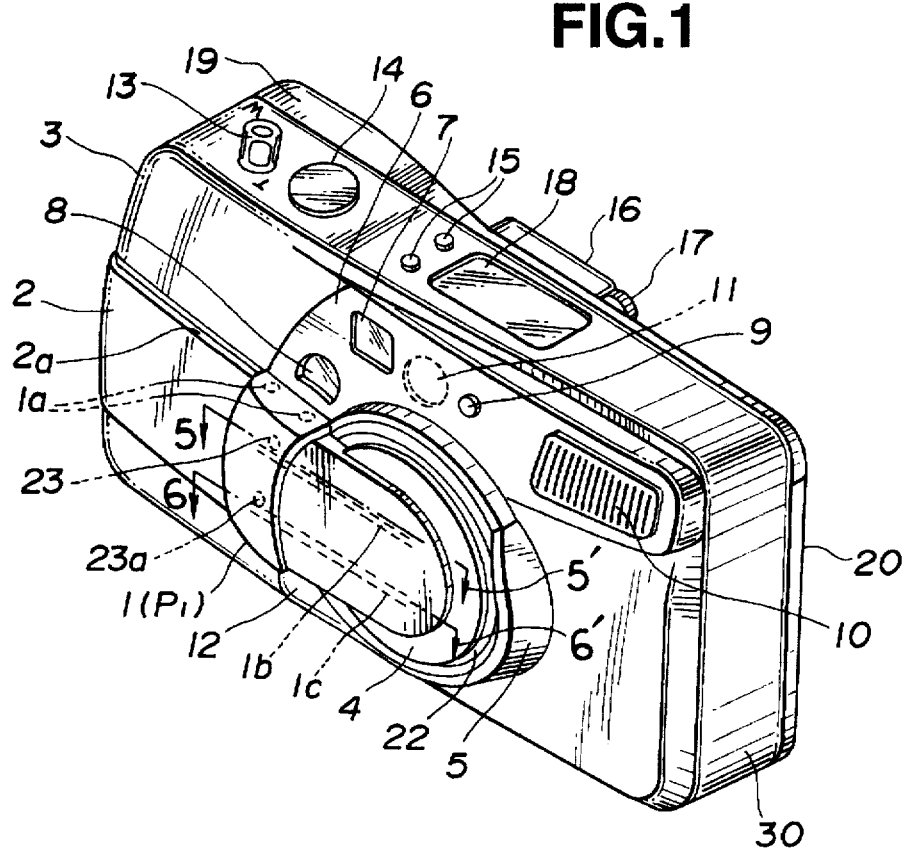
FIG. 1 is an external perspective view showing the camera of a first embodiment of the present invention with its barrier fully closed.

Referring now to the drawings, the embodiments of the present invention are discussed.

Figure 2:
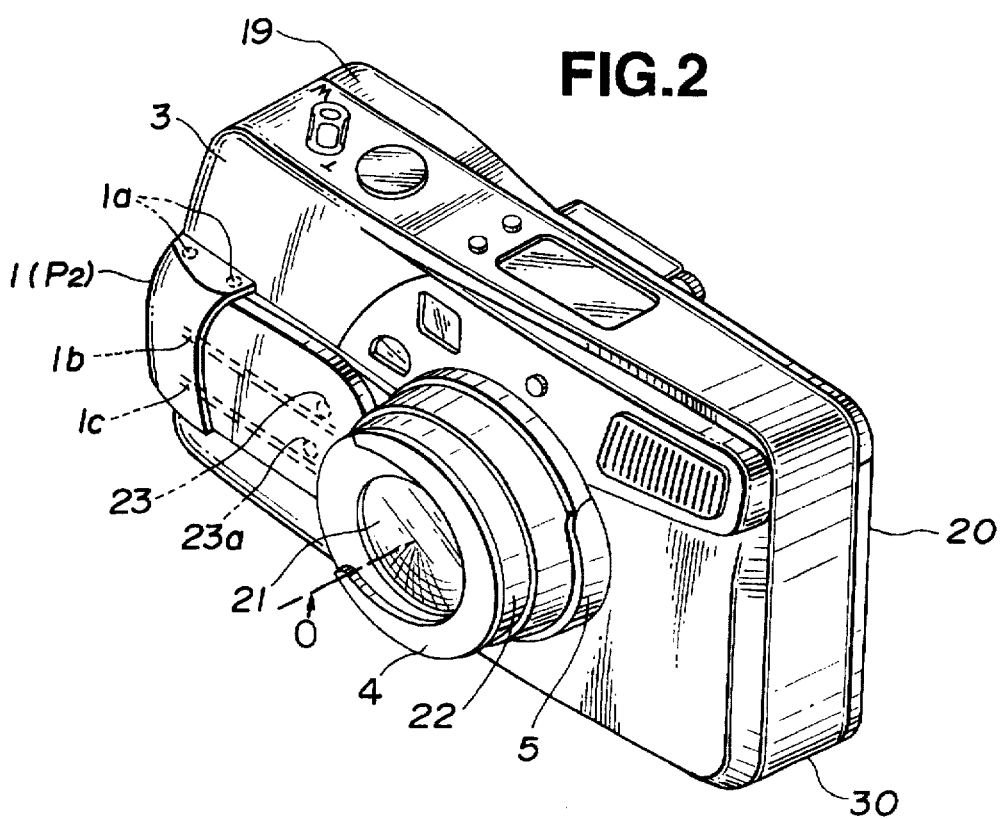
FIG. 2 is an external perspective view of the camera of FIG. 1 with its barrier fully opened and a lens barrel of an imaging lens projecting from the camera body.

FIGS. 1 and 2 are perspective views of the camera in the first embodiment of present invention. FIG. 1 shows the camera with the barrier fully closed, and FIG. 2 shows the camera with the barrier fully opened.

As shown in FIGS. 1 and 2, the camera of this embodiment has a front cover 3 that is an integral part of a camera body 30 and a rear cover 19 attached on the back of the camera body 30.

Disposed on the top face of the camera body 30 are a zoom button 13 for zooming operation, a release button 14, mode switch buttons 15, an LCD display 18 and the like.

The front cover 3 has a front cover projection 5, an AF (autofocus) photosensitive module 12, a rail block 2 constituting an integral part of the camera body, for supporting a barrier 1 as the barrier means and having an integral rail portion 2a that extends in a horizontal direction approximately perpendicular to the lens optical axis O of the camera (see FIG. 2), and a front panel 6 made of an infrared-light transmissive material.

The front cover 3 has further an AF light projection opening 11 inside the front panel 6. The front panel 6 is provided with an object viewfinder opening 7, an AE (photometering) opening 8, a self-timer LED 9, and opening members such as a flashing opening 10.

The fixed rear cover 19 has a viewfinder eyepiece section 16, a dioptric correction knob 17, and an openable rear cover 20.

A lens barrel 22 that houses an imaging lens 21 is supported in a manner that allows the lens barrel 22 to move in the direction of the optical axis between its retracted position and ready-to-photograph position.

The rail block 2 supports the barrier 1 that is movable between a fully closed position (position P1 in FIG. 1) where the barrier 1 fully covers the front side of the imaging lens 21 and a fully opened position (position P2 in FIG. 2) where the barrier 1 is fully retracted clear of the imaging lens 21. The barrier 1 is of a compact construction so that its width measured across the barrier is narrower than the outer diameter of the lens barrel 22 but is at least wide enough to cover the imaging lens 21.

Since the barrier 1 is narrower than the outer diameter of the lens barrel 22, the front end portion 4 of the lens barrel is generally U-shaped, and is projected forwardly so that the step between the front end 4 and the barrier 1 is reduced when the barrier 1 is closed. An external force that happens to be applied to the front side of the camera can also be applied to the lens barrel 22. To protect the lens barrel 22, the cover projection 5 is integrally formed with the front cover 3, and the barrier 1 along with the cover projection 5 withstands the external force.

When the barrier 1 slides along a barrier guide rail portion 2a from the fully closed position P1 in FIG. 1 to the fully opened position P2 in FIG. 2, an unshown power switch is turned to on, and the lens barrel 22 is projected forward to its ready-to-photograph position. When the barrier 1 is placed at the fully closed position P1 or at the fully opened position P2, a spring 24 urges a ball 23 to press against a cam 1b, as click means, formed on the rear surface of the barrier 1 (refer to FIGS. 3 and 4), and thus the barrier 1 is held at either the fully closed position P1 or at the fully opened position P2.

Referring to FIGS. 3 through 8, the support and click mechanism of the barrier 1 is now discussed.

Figure 3:
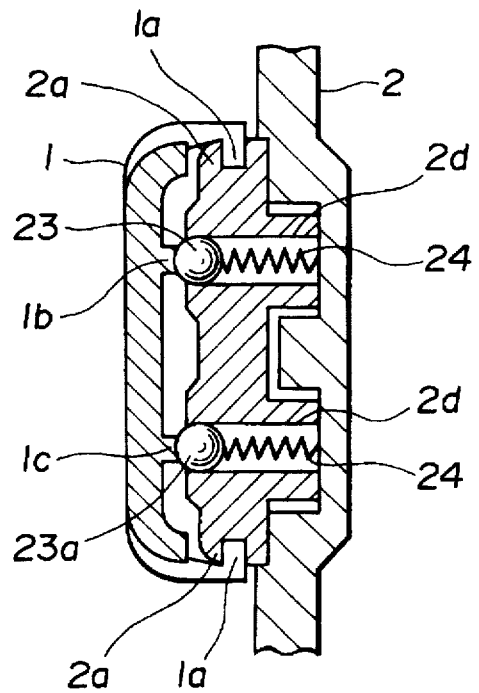
FIG. 3 is a vertical cross-sectional view of the barrier mechanism in the camera of FIG. 1.
Figure 4:
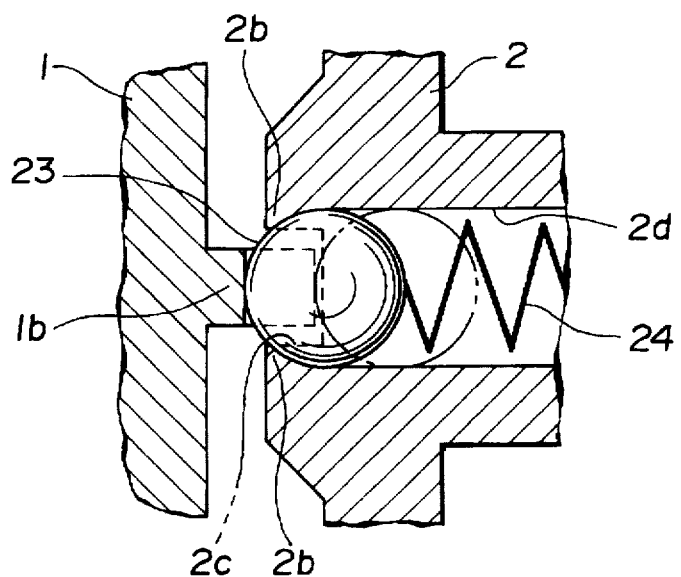
FIG. 4 is an enlarged cross-sectional view of the ball and its associated components in the barrier mechanism of FIG. 3.
Figure 5:
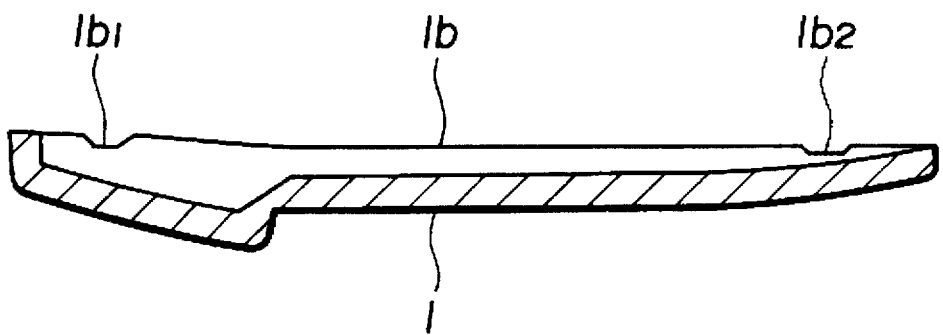
FIG. 5 is a cross-sectional view of an opening and closing click cam constituting click means of the camera of FIG. 1, taken along a line V—V in FIG. 1, namely along the direction of sliding movement of the barrier.
Figure 6:
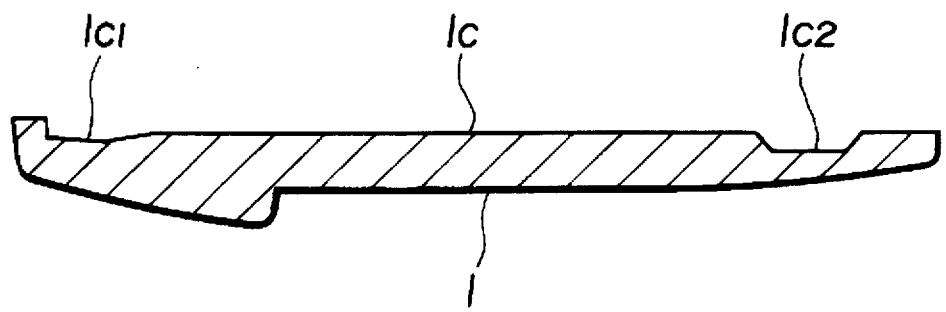
FIG. 6 is a cross-sectional view of the half-opening click cam constituting click means of the camera of FIG. 1, taken along a line V1—V1 in FIG. 1, namely along the direction of sliding movement of the barrier.
Figure 7:
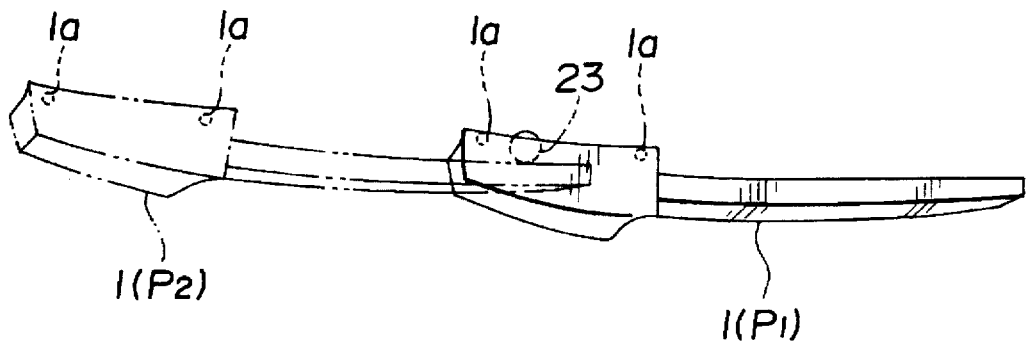
FIG. 7 is a top view showing the barrier of the camera of FIG. 1 at its closed (solid line) and opened (dotted line) positions.
Figure 8:
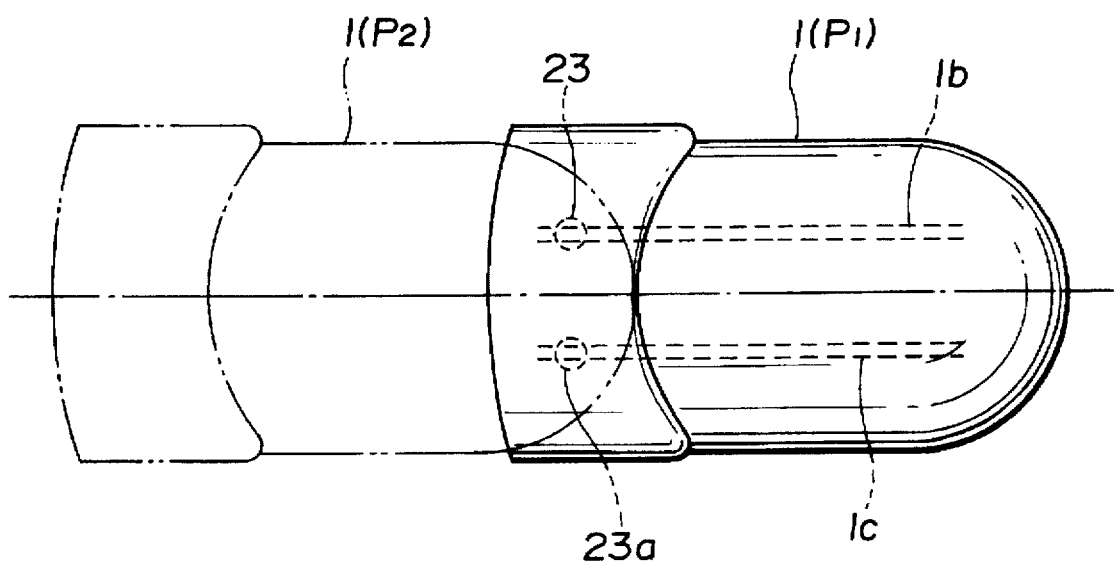
FIG. 8 is a front view showing the barrier of the camera of FIG. 1 at its closed (solid line) and open (dotted line) positions.

FIG. 3 is the vertical cross-directional view of the barrier mechanism, and FIG. 4 is the enlarged cross-sectional view of the ball and its associated components in the barrier mechanism. FIG. 5 is the cross-sectional view of an opening and closing click cam constituting click means of the camera of FIG. 1, taken along the line V—V in FIG. 1, namely along the direction of sliding movement of the barrier. FIG. 6 is the cross-sectional view of the half-opening click cam constituting click means of the camera of FIG. 1, taken along the line V1–V1' in FIG. 1, namely along the direction of sliding movement of the barrier. FIG. 7 is the top view showing the barrier at its closed and opened positions. FIG. 8 is a front view showing the barrier at its closed and opened positions.

Referring to FIG. 3, the barrier 1 is slidably supported by the rail block 2 with the pawl portions 1a of the barrier 1 engaged with the rail portions 2a of the rail block 2. With spring-urged balls 23, 23a pressing the barrier 1, a clicking force is generated at the fully closed position, fully opened position and half-opened position. The opening/closing click cam 1b and half-opening click cam 1c are arranged on the rear surface of the barrier 1 in the direction of sliding.

The half-opened position of the barrier 1 is provided for the following reason. In the course of sliding of the barrier 1 along the rail portions 2a from the opened position in FIG. 2 to the closed position in FIG. 1, the end of the barrier 1 will touch the lens barrel 22 if the lens barrel 22 remains projected. Thus, the barrier 1 is briefly stopped at the half-opened position, close to the lens barrel 22, and waits there for the lens barrel 22 to be fully retracted.

The rail block 2 is rigidly attached to the front cover 3, and is provided with the rail portions 2a functioning as barrier guides and also provide ball housing holes 2d that house the opening/closing click ball 23 and half-opening click ball 23a as click means in a manner that allow the balls to slidably move therein.

As shown in FIGS. 3 and 4, the balls 23, 23a are forwardly urged (toward the barrier 1) by opening closing click spring 24 and half-opening click spring 24a as click means. The balls 23, 23a do not slip off to the barrier side, because ball slip-off prevention portions 2b for restraining projection of the balls are integrally formed with the rail block 2.

Along the paths through which the click cams 1b and 1c pass, the rail block 2 has grooves 2c which run horizontally at the levels of the ball slip-off prevention portions 2b in the direction of sliding for receiving the opening/closing click cam 1b and the half-opening click cam 1c as shown in FIG. 4.

The opening/closing click cam 1b extends in the direction of sliding on the rear surface of the barrier 1, and the open/closing ball 23 slides on the cam face of the click cam 1b to generate a clicking force. The opening/closing click cam 1b has a recess 1b1 that receives the click ball 23 at the fully closed position of the barrier 1 and a recess 1b2 that receives the click ball 23 at the fully opened position of the barrier 1 as shown in FIG. 5.

The half-opening click cam 1c extends in the direction of sliding on the rear surface of the barrier 1 below the opening/closing click cam 1b. The half-opening click ball 23a slides on the cam face of the click cam 1c to generate a click force. The half-opening click cam 1c has an inclined recess 1c1 functioning as a relief portion for the click ball 23a at the fully closed position of the barrier 1 and a recess 1c2 that receives the click ball 23a at the half-opened position of the barrier 1 as shown in FIG. 6.

The opening/closing click ball 23 and the half-opening click ball 23a are housed in the ball housing holes 2d of the rail block 2 in a slidably movable fashion. The ball housing holes 2d need to be arranged such that they face the paths of the cams on the rear surface of the barrier 1 when the barrier 1 is at its fully closed position P1 and fully opened position P2 of the barrier 1 as shown in the plan view of the barrier 1 in FIG. 7 and the front view in FIG. 8.

To be ready for use, namely for photographing, the camera of this embodiment having the barrier mechanism thus constructed slides the barrier 1 from the fully closed position P1 in FIG. 1 to the fully opened position P2 in FIG. 2, with a click force being generated at each position, and then the imaging lens 21 is exposed.

The barrier 1 is moved toward its fully closed position to put the camera from its ready-to-photograph position to its retracted position. In this course of the movement, however, the barrier 1 is subjected to a half-opening click force at the half-opened position when the end of the barrier 1 comes close to the side of the lens barrel 22, and pauses briefly for the lens barrel 22 to be fully retracted. The barrier 1 then moves to the fully closed position P1.

With the barrier 1 at its fully closed position P1, the opening/closing click ball 23 and half-opening click ball 23a are placed close to the pawl portions 1a as shown in FIGS. 1 and 7. Although the barrier 1 is urged by the balls, the barrier 1 is prevented from lifting, because the pawl portions 1a of the barrier 1 are engaged with the rail portions 2a.

With the barrier 1 at its fully opened position P2, the pawl portions 1a are positioned farthest outwardly from the click balls 23, 23a as shown in FIGS. 2 and 7. In the click means in the barrier of the known camera where projection of the click balls 23, 23a out of the rail block 2 is not restrained, the end of the barrier 1 might lift from the side of the camera body through deflection of the barrier 1 and looseness in the engagement of the rail pawl portions 1a with the rail portions 2a.

In the camera of this embodiment, the rail block 2 is provided with the ball slip-off prevention portions 2b at the opening ends of the ball housing holes 2d in order to restrain projection of the click balls 23, 23a urged by the click springs, in particular, in order not to exert an unnecessarily large force to the barrier 1 at its fully opened position P2. This arrangement prevents the end of the barrier 1 from lifting from the side of the camera body when the barrier 1 is at its fully opened position P2.

Although, as discussed above, the barrier 1 whose width measured across the barrier is narrower than the diameter of the lens barrel 22, the thickness of the barrier 1 is reduced. Thus, the overall thickness of the camera body is not so thick as that of the known camera. The ball slip-off prevention portions 2b formed on the rail block 2 restrain projection of the click balls 23, 23a, thereby preventing the barrier 1 from lifting.

Since the ball slip-off prevention portions 2b prevent the click balls 23, 23a from coming off from the front of the rail block 2 when the barrier 1 is assembled, ease of assembly of the barrier 1 is enhanced. The use of spherical click balls as click means for the barrier offers a cost advantage.

The camera of this embodiment employs the compact barrier having a width narrower than the diameter of the lens barrel housing the imaging lens, and restrains projection of the balls as the click means by means of the ball slip-off prevention portions even when the barrier is placed at its fully opened position. Thus, the end of the barrier is prevented from lifting. As already described, the barrier having the width narrower than the diameter of the lens barrel, and the thickness of the barrier is reduced. This arrangement offers a cost advantage. Since the ball slip-off prevention portions prevent the balls from slipping off when being assembled, ease of assembly is enhanced.

Referring to the cross-sectional views in FIGS. 9A and 9B, the camera of the second embodiment of the present invention is now discussed.

Out of the click means of the camera in this embodiment, the opening/closing click cams are different from those in the first embodiment in that the click cams have tapered faces in a symmetrical fashion. The rest of the construction of the second embodiment remains unchanged from the first embodiment.

FIG. 9A is the enlarged vertical cross-sectional view showing the click mechanism constituting the barrier click means of the camera of this embodiment, and FIG. 9B is the cross-sectional view taken along the line 9B—9B' in FIG. 9A. As shown, the cams of the click mechanism employ beveled cams 1d extending in the direction of sliding of the barrier 1 and having symmetrically beveled faces on both side open sideways in their vertical cross-sectional view, instead of the vertical cam faces of the opening/closing click cam 1b and half-opening click cam 1c.

The click ball 23 is pressed into contact with the beveled cam 1d, generating a click force. In this arrangement, the ball slip-off prevention portions 2b formed on the top edge and bottom edge of the ball housing holes 2d in the rail block in the first embodiment are not formed in this embodiment, because the cam 1d is projected into the rail block side. For this reason, ball slip-off prevention portions 2e are formed on the left- and right-hand edges of the ball housing hole 23 between the upper and lower cam faces of the beveled cam 1d in the direction of sliding.

The camera with the click mechanism in this embodiment offers the same advantage as the camera in the first embodiment, and further Generates a reliable click force through the click beveled cam 1d. The use of the symmetrically beveled faces of the cam 1d reliably generates the feel of click.

Referring to FIG. 10, the camera of the third embodiment of the present invention is now discussed.

The holding and guiding mechanism for the barrier in this embodiment is different from the camera of the first embodiment in that the path of the rail portion of the rail block is corrected to further reduce lifting of the barrier at its fully opened position. The rest of the construction in this embodiment remains unchanged from the camera in the first embodiment.

FIG. 10 illustrates the movement of the barrier 1 from its fully closed position P1 to its fully opened position P2 in the third embodiment of the present invention when the camera is viewed from above. The rail portion of the rail block 2 in the first embodiment takes the shape 2f in FIG. 10 when the barrier 1 is slid along the rail block 2 to the fully opened position P2 with no consideration given to looseness in the engagement of the pawl portions 1a with the rail portion 2a and deflection of the barrier 1 in FIG. 3.

The barrier 1 engaged with the rail portion 2f may be possibly lifted as shown by the position 1D of the barrier 1 in FIG. 10 when the barrier 1 is at its fully opened state (fully opened position P2).

The camera in this embodiment features the corrected rail portion 2g of the rail block so that the end of the barrier comes closer to the camera body in its sliding path as shown in FIG. 10.

As described above, by using the rail portion 2g of the rail block 2, the end of the barrier 1 is drawn closer to the camera body as shown by the position 1E in FIG. 10 even when urging of the click balls 23, 23a directly or indirectly act on the end portion of the barrier 1 with the barrier 1 at its fully opened position P2. Lifting of the barrier 1 is thus restrained.

In the camera in this embodiment, the sliding path of the rail portion of the rail block is corrected so that the end portion of the barrier at its fully opened position is drawn closer to the camera body. Thus, lifting of the barrier from the camera body is prevented.

What is claimed is:

1. A camera with barrier means movable from a fully closed position where the barrier means entirely covers a front of an imaging lens to a fully opened position where the barrier means is fully retracted clear of the front of the imaging lens, said camera further comprising:

ball means mounted on a camera body and urged in a direction as to exert a pressing force on the barrier means;

a projection restraint member formed on said camera body for preventing said urged ball means from being urged out of said camera body even in an absence of said barrier means and for limiting an amount of said urged ball means projecting out of said camera body, whereby to adjust the pressing force exerted on said barrier means when said barrier means is mounted on said camera; and a cam mounted on the barrier means, for causing the barrier means to click in cooperation with the ball means at least at one of the fully closed position and the fully opened position.

2. A camera with barrier means movable from a fully closed position where the barrier means entirely covers a front of an imaging lens to a fully opened position where the barrier means is fully retracted clear of the front of the imaging lens, said camera further comprising:

cam means provided on the barrier means;

ball means pressed into contact with the cam means;

a hole disposed in a camera body, for housing the ball means and urging means for urging the ball means in a direction toward the cam means; and projection restraint means provided on said camera body adjacent to said hole for restraining projection of the ball means out of an opening end of the hole toward the barrier means.

3. A camera according to claim 2, wherein said projection restraint means comprises at the opening end of the hole a restraint face of a diameter smaller than a diameter of said ball means and being in contact with part of a surface of the ball means.

4. A camera with barrier means movable from a fully closed position where the barrier means entirely covers a front of an imaging lens to a fully opened position where the barrier means is fully retracted clear of the front of the imaging lens, said camera further comprising:

cam means provided on the barrier means;

ball means pressed into contact with the cam means;

a hole disposed in a camera body, for housing the ball means and urging means for urging the ball means in a direction toward the cam means;

projection restraint means provided on said camera body adjacent to said hole for restraining projection of the ball means out of an opening end of the hole toward the barrier means; and wherein there are provided beveled faces symmetrical with respect to a neutral axis of the hole, at each of the fully opened position and the fully closed position, at a cross-section taken along a plane in which the neutral axis of the hole lies, and which is aligned at a right angle to a direction of sliding movement of the barrier means, whereby each of said beveled faces remains in contact with the ball means.

5. A camera including a camera body and barrier means slidably mounted on the camera body and movable from a fully closed position where the barrier means entirely covers a front of an imaging lens to a fully opened position where the barrier means is fully retracted clear of the front of the imaging lens, said camera further comprising:

ball means which is mounted in the camera body and which is placed in a vicinity of an end of the barrier means to the imaging lens side with the barrier means at the fully opened position and urged in such a direction as to press against the barrier means;

a cam mounted on said barrier means, for causing the barrier means to click in cooperation with the ball means at least at the fully closed position and at the fully opened position;

restraint means formed on said camera body for preventing the ball means from falling out of said camera body even in an event that the barrier means is not mounted on the camera body and for restraining the urging of said ball means against said camera when said barrier is mounted on the camera body; and a rail provided on said camera body for slidably guiding said barrier means therealong, said rail moving an end of the barrier means for covering said lens closer to said camera body as the barrier means moves to said fully opened position, whereby the barrier means is prevented from lifting away from the camera body under urging of the ball means against the cam.

6. A camera with barrier means movable from a fully closed position where the barrier means entirely covers a front of an imaging lens to a fully opened position where the barrier means is fully retracted clear of the front of the imaging lens, said camera further comprising:.

click means comprising a cam formed on a rear surface of the barrier means to hold the barrier means at the fully closed position and at the fully opened position, and a ball and a spring for urging the ball against the cam;

a slip-off prevention member provided in the click means, for restraining projection of the ball under urging of the spring beyond a given position; and wherein said cam comprises mutually oppositely beveled faces symmetrical with respect to a center of the ball in a vertical plane perpendicular to a direction of sliding movement of the barrier means, whereby the beveled faces remain in contact with the ball at two points.

7. A camera having barrier means movable from a fully closed position where the barrier means entirely covers a front of an imaging lens to a fully opened position Where the barrier means is fully retracted clear of the front of the imaging lens, click means comprising a cam that is formed on a rear surface of the barrier means to hold the barrier means at the fully closed position and at the fully opened position, and a ball and a spring for urging the ball toward said cam, said camera further comprising:

a slip-off prevention member provided in the click means, for restraining projection of the ball under urging of the spring beyond a given position; and said cam comprises mutually oppositely beveled faces symmetrical with respect to the ball in a vertical plane perpendicular to a direction of sliding movement of the barrier means, whereby the beveled faces remain in contact with the ball at two points.

8. A camera having barrier means movable from a fully closed position where the barrier means entirely covers a front of an imaging lens to a fully opened position where the barrier mean is fully retracted clear of the front of the imaging lens, and click means comprising a cam that is formed on a rear surface of the barrier means to hold the barrier means at the fully closed position and at the fully opened position, and a ball and a spring for urging the ball toward said cam, said camera further comprising:

a slip-off prevention member provided in the click means, for restraining projection of the ball under urging of the spring beyond a given position; and a rail slidably engaged with the barrier means, for guiding the barrier means, whereby said rail is formed such that an end of the barrier means to the imaging lens side is drawn closer to a body of the camera in a direction parallel with an optical axis of the imaging lens with the barrier means at the fully opened position.

9. A camera having a camera body and barrier means slidably mounted upon the camera body and movable from a fully closed position where the barrier means entirely covers a front of an imaging lens to a fully opened position where the barrier means is fully retracted clear of the front of the imaging lens, said camera further comprising:

click means for urging the barrier means forwardly and away from the camera in substantially the same direction as an optical axis of the imaging lens;

click cam means disposed on a rear surface of the barrier means so that the click cam means contacts a click member of the click means at the fully closed position and at the fully opened position; and slip-off prevention means provided on said camera body for restraining projection of the click member, whereby lifting of the barrier by the click means in a direction substantially the same as an optical axis is restrained beyond a given position.

10. A camera with barrier means movable from a fully closed position where the barrier means entirely covers a front of an imaging lens to a fully opened position where the barrier means is fully retracted clear of the front of the imaging lens, said camera comprising:

rail means provided for guiding movement of the barrier means, said rail means engaging a body of the camera with the barrier means; and click means provided to cause the barrier means to click at one of the fully closed position and the fully opened position; said click means comprising ball means on the camera body side, urging means for urging the ball means against the barrier means, a ball guide hole in the camera body for guiding the ball means, and projection restraint means provided on said camera body for restraining projection of the ball means in a direction that the ball means is urged by the urging means beyond a given position, whereby the barrier means has a recess into which the ball means is pressed to generate a click.

11. A camera according to claim 10, wherein said projection restraining means comprises a tapered projection extending radially inward from an inner periphery of said guide hole and engaging the ball means to prevent the ball means from dropping out of the guide hole even in an absence of said barrier means.

12. A camera according to claim 10, wherein said hole is provided with a slotted portion for enabling the barrier means to slide therethrough in moving between the fully closed and fully opened positions.

13. A camera having a camera body and barrier means slidably mounted on the camera body and movable between a fully closed position where the barrier means entirely covers a front of an imaging lens to a fully opened position where the barrier means is fully retracted to be clear of the front of the imaging lens, said camera comprising:

cam means provided on said barrier means a hole disposed in the camera body;

ball means housed in said hole;

urging means housed in said hole for urging said ball means towards said cam means against a pushing force by said barrier means when said barrier means is mounted upon the camera body such that said ball means is pushed by said barrier means, and urging force adjusting means provided on the camera body at an opening end of said hole closer to said barrier means for restraining projection of the ball means when said ball means projects from the opening end of said hole towards said barrier means by the urging force of said urging means, whereby to adjust the urging force when said urging means urges said barrier means.

* * * * *